(12) United States Patent
Kawahara et al.

(10) Patent No.: US 8,857,586 B2
(45) Date of Patent: Oct. 14, 2014

(54) LOCKUP DEVICE FOR TORQUE CONVERTER

(75) Inventors: Yuki Kawahara, Osaka (JP); Naoki Tomiyama, Hirakata (JP)

(73) Assignee: EXEDY Corporation, Osaka (JP)

( * ) Notice: Subject to any disclaimer, the term of this patent is extended or adjusted under 35 U.S.C. 154(b) by 225 days.

(21) Appl. No.: 13/513,820

(22) PCT Filed: Nov. 11, 2010

(86) PCT No.: PCT/JP2010/070077
§ 371 (c)(1),
(2), (4) Date: Jun. 4, 2012

(87) PCT Pub. No.: WO2011/070888
PCT Pub. Date: Jun. 16, 2011

(65) Prior Publication Data
US 2012/0241273 A1  Sep. 27, 2012

(30) Foreign Application Priority Data

Dec. 10, 2009 (JP) .................... 2009-280025

(51) Int. Cl.
*F16H 45/02* (2006.01)

(52) U.S. Cl.
CPC ........ *F16H 45/02* (2013.01); *F16H 2045/0205* (2013.01); *F16H 2045/0226* (2013.01); *F16H 2045/0294* (2013.01); *F16H 2045/0231* (2013.01)

USPC ........................................ 192/3.29; 192/213.2

(58) Field of Classification Search
USPC .......................................... 192/213.2, 213.1
See application file for complete search history.

(56) References Cited

U.S. PATENT DOCUMENTS 6,050,376 A * 4/2000 Yabe ............................ 192/3.29
2003/0173175 A1* 9/2003 Tomiyama .................... 192/3.29

FOREIGN PATENT DOCUMENTS

JP  2001-82577      3/2001
JP  2009-250288 A   10/2009

* cited by examiner

*Primary Examiner* — Rodney H Bonck
(74) *Attorney, Agent, or Firm* — Global IP Counselors, LLP

(57) ABSTRACT

The lockup device includes a piston that is coupled to a front cover, a drive plate coupled to the piston, a plurality of outer peripheral-side torsion springs to which torque is inputted from the drive plate, and a float member that is arranged on the turbine side of the outer peripheral-side torsion springs and serves to make two of the outer peripheral-side torsion springs operate in series. The float member has a main body portion and an inner peripheral support portion. The main body portion covers an outer peripheral portion and a turbine-side side portion of the outer peripheral-side torsion springs. The inner peripheral support portion extends from the main body section toward an inner periphery and supported on an output side of the intermediate member.

3 Claims, 2 Drawing Sheets

LOCKUP DEVICE FOR TORQUE CONVERTER

CROSS-REFERENCE TO THE RELATED APPLICATIONS

This U.S. national phase application claims priority to Japanese Patent Application No. 2009-280025 filed on Dec. 10, 2009. The entire disclosure of Japanese Patent Application No. 2009-280025 is hereby incorporated herein by reference.

The present invention relates to a lockup device. More particularly, the present invention relates to a lockup device that is arranged in a space between a front cover and a turbine of a torque converter and serves to mechanically connect the front cover and the turbine together.

BACKGROUND

Torque converters are often provided with a lockup device for transmitting torque directly from the front cover to the turbine. This lockup device has a piston that can frictionally couple to the front cover, a drive plate onto which the piston is fixed, a plurality of torsion springs supported by the drive plate, and a driven plate elastically coupled to the piston in a rotational direction by the torsion springs. The driven plate is fixed to the turbine.

The piston divides a space between the front cover and the turbine in an axial direction and can be moved in the axial direction by a hydraulic pressure difference in both axial-direction sides. Also, torque of the front cover is transmitted to the lockup device when an annular friction facing provided on an outer peripheral portion of the piston is pressed against a flat friction surface of the front cover.

When torque is being transmitted with the lockup device, it is necessary to change the torsion springs to a lower stiffness and a wider twisting angle in order to absorb and attenuate torque fluctuations inputted from an engine. Therefore, as shown in Patent Document 1, a device has already been proposed in which torsion springs are arranged on each of an outer peripheral portion and an inner peripheral portion. The torsion springs on the outer peripheral side and the torsion springs on the inner peripheral side are coupled by an intermediate member.

Laid-open Japanese Patent Application Publication No. 2001-82577 (Patent Document 1) is an example of the related art

SUMMARY

Object the Invention is to Achieve

In the lockup device shown in Patent Document 1, the torsion springs on the outer peripheral side and the torsion springs on the inner peripheral side operate in series through the intermediate member. The torsion springs on the inner peripheral side are arranged such that two coil springs operate in series. Consequently, a damper twisting angle is widened.

However, in recent years, there is a demand for lowering fuel consumption by further improving characteristics and, thus, there is a need to widen the damper twisting angle more and lower the stiffness further.

Therefore, the present inventors have already filed an application (Patent Application No. 2009-195109) for a lockup device configured such that a plurality of torsion springs on an outer peripheral side operate in series. In the device, the plurality of outer periphery-side torsion springs and inner periphery-side torsion springs operate in series through an intermediate member and, additionally, the outer periphery-side torsion springs operate in series through a float member.

The float member of the previously filed lockup device is arranged between a piston and the outer periphery-side torsion springs. In such a configuration, the float member cannot extend toward the inner periphery because interference with other members (particularly a plate that supports an inner peripheral portion of the outer peripheral-side torsion springs) must be avoided. Since a comparatively large stress develops in the float member due to centrifugal force, it is necessary to increase its stiffness. However, with a float member configured as previously explained, there are cases in which the stiffness is low and the strength is insufficient.

An advantage of the present invention is to increase with a simple structure the stiffness of a float member serving to make a plurality of elastic members operate in series in a lockup device for a torque converter.

A lockup device for a torque converter according to a first aspect of the invention is a device that is arranged between a front cover and a turbine of a torque converter and serves to mechanically connect the front cover and the turbine. The device includes a piston that can be coupled to the front cover, a drive plate coupled to the piston, a plurality of elastic members to which torque is inputted from the drive plate, a float member, and an output portion. The float member is arranged on the turbine side of the elastic members and serves to make at least two of the elastic members operate in series. The output portion couples the elastic members and the turbine together. The float member has a main body portion and an inner peripheral support portion. The main body portion covers an outer peripheral portion and a turbine-side side portion of the elastic members. The inner peripheral support portion extends toward the inner periphery from the main body portion and supported such that it rotates freely relative to the output portion.

With the device, when the piston is coupled to the front cover, torque from the engine is transmitted from the front cover to the piston and then transmitted to the drive plate. The torque transmitted to the drive plate is transmitted from the elastic members to the turbine through the output portion. At least two of the elastic members operate in series through the float member.

Since the float member is arranged on the turbine side of the elastic members, it can extend toward the inner periphery and has an inner peripheral support portion. The existence of inner peripheral support portion causes the stiffness of the float member with respect to centrifugal force to increase.

A lockup device for a torque converter according to a second aspect of the invention is the device according to the first aspect, wherein the output portion includes a driven plate coupled to the turbine, a plurality of inner peripheral-side elastic members, and an intermediate member. The inner peripheral-side elastic members are arranged on the inner peripheral side of the elastic members and transmit torque to the driven plate. The intermediate member can rotate relative to the drive plate and the driven plate and transmits torque from the elastic members to the inner peripheral-side elastic member.

With this aspect, the damper twisting angle can be widened further because the elastic members and the inner peripheral-side elastic members operate in series because of the intermediate member.

A lockup device for a torque converter according to a third aspect of the invention is the device according to the second aspect, wherein the intermediate member has a first plate and a second plate that are arranged on both axial-direction sides of the driven plate and support the inner peripheral-side elastic members and a pin that fastens the first and second plates. The inner peripheral support portion of the float member is supported such that it can rotate in a prescribed angular range with respect to the pin.

With this aspect, since the float member is supported using the pin that fastens the first plate and the second plate, the structure serving to support the float member is simplified.

DETAILED DESCRIPTION OF EXEMPLARY EMBODIMENTS

Figure 1:
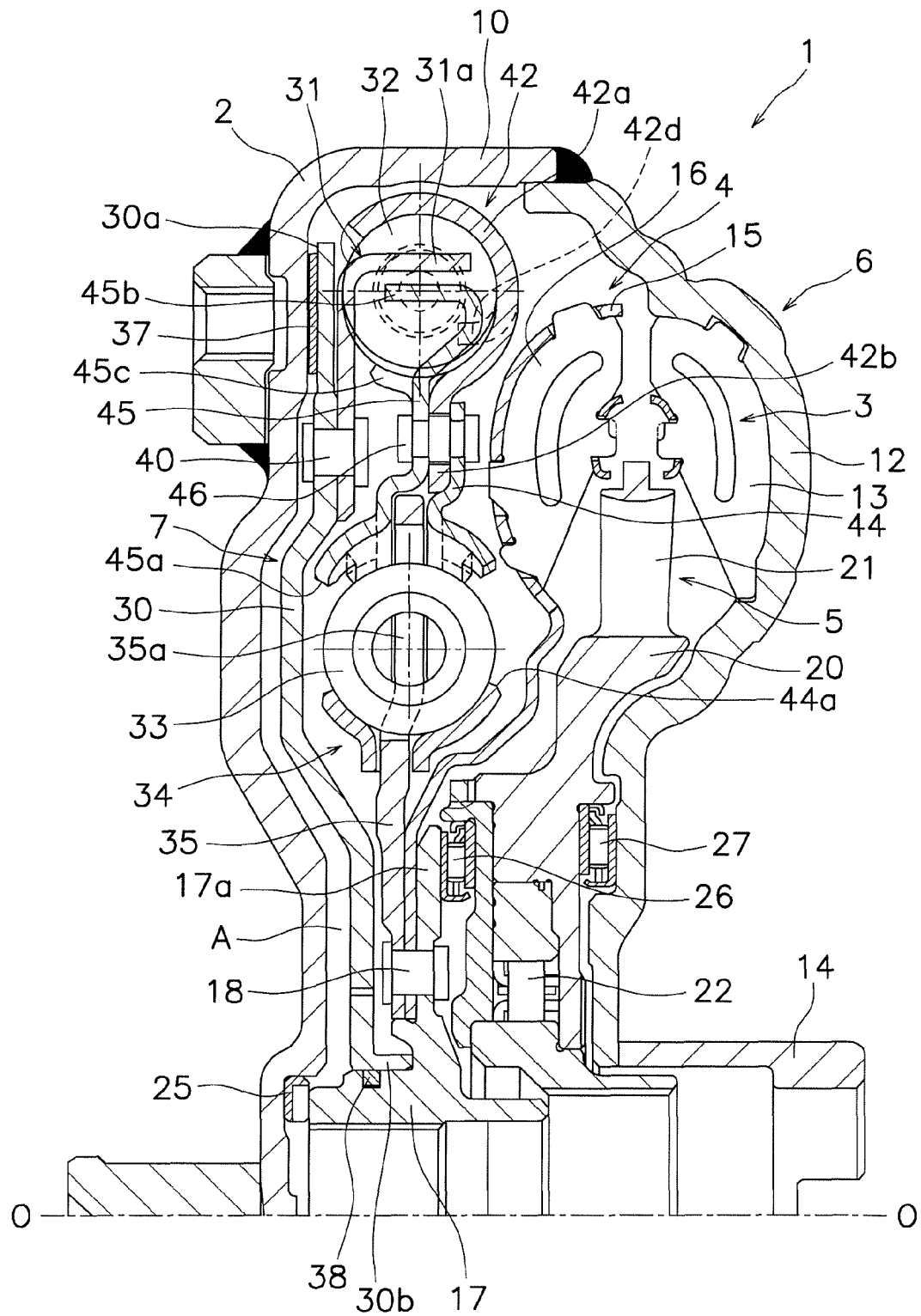
FIG. 1 is a partial sectional view of a torque converter equipped with a lockup device according to an embodiment of the present invention.
Figure 2:
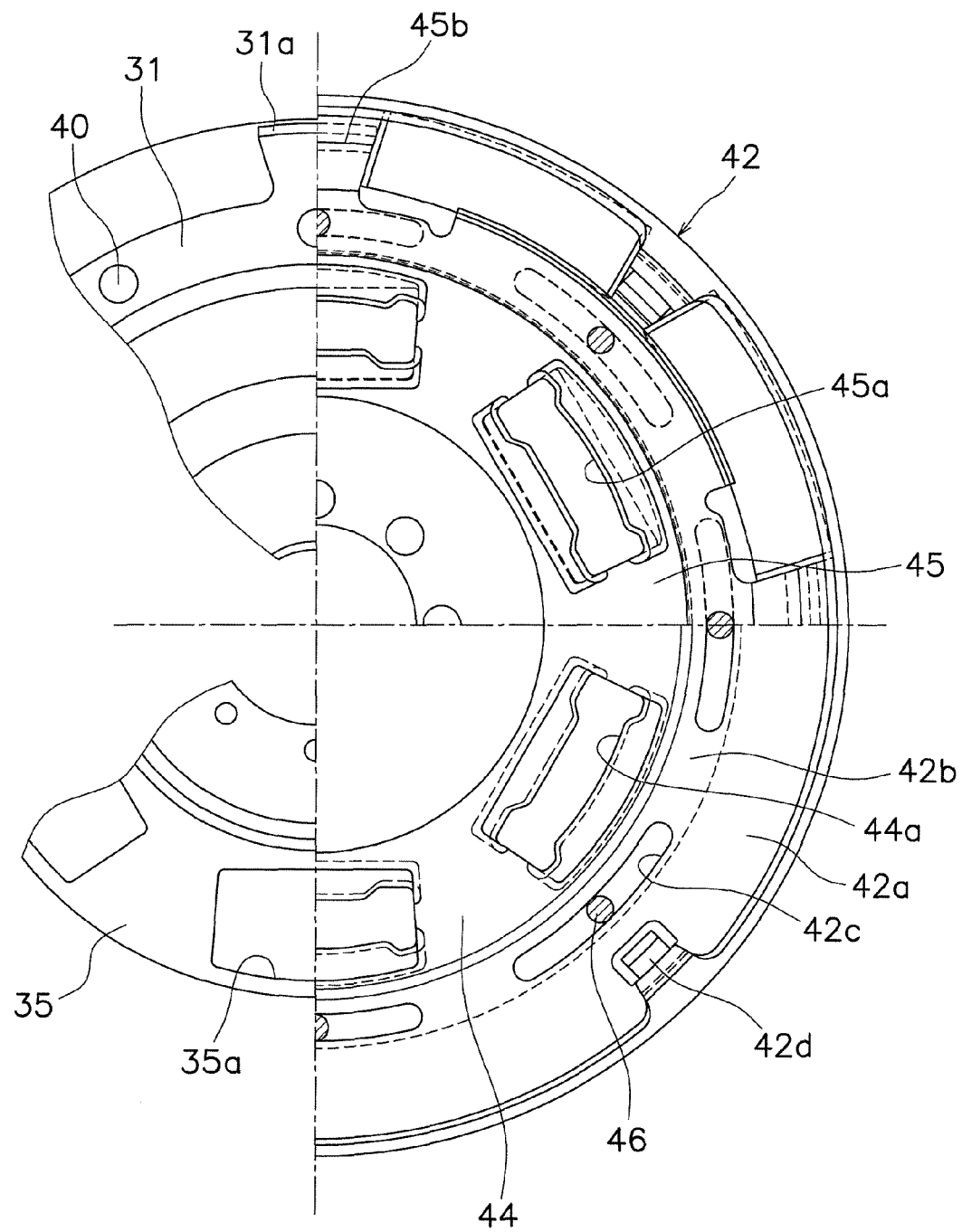
FIG. 2 is a partial frontal view of the lockup device.

FIG. 1 is a partial sectional view of a torque converter 1 in which a lockup device according to an embodiment of the present invention is employed. An engine (not shown) is arranged on a left-hand side of FIG. 1 and a transmission (not shown) is arranged on a right-hand side of the figure. FIG. 2 is a partial frontal view of the lockup device. In FIG. 2, the torsion springs serving as elastic members are omitted. Also, different portions of FIG. 2 depict the torque converter with different parts removed. The line O-O shown in FIG. 1 is a rotational axis of the torque converter and the lockup device.

[Overall Configuration of Torque Converter]

The torque converter 1 is a device for transmitting torque from a crankshaft (not shown) of the engine to an input shaft of the transmission and includes a front cover 2 fixed to a member on an input side, a torque converter main body 6 made up of three types of bladed wheel (impeller 3, turbine 4, and stator 5), and a lockup device 7.

The front cover 2 is a circular disk-shaped member having an outer peripheral cylindrical portion 10 on an outer peripheral portion thereof that protrudes in an axial direction toward the transmission. The impeller 3 includes an impeller shell 12, a plurality of impeller blades 13, and a cylindrical impeller hub 14. The impeller shell 12 is fixed by welding to the outer peripheral cylindrical portion 10 of the front cover 2. The impeller blades 13 are fixed to an inside of the impeller shell 12. The impeller hub 14 is provided on an inner peripheral side of the impeller shell 12. The turbine 4 is arranged inside a fluid chamber facing opposite the impeller 3. The turbine 4 includes a turbine shell 15, a plurality of turbine blades 16 fixed to the turbine shell 15, and a turbine hub 17 fixed to an inner peripheral side of the turbine shell 15. The turbine hub 17 has a flange 17a that extends radially outward, and an inner peripheral portion of the turbine shell 15 is fastened to the flange 17a with a plurality of rivets 18. Also, the input shaft of the transmission (not shown) is spline-engaged with an inner peripheral portion of the turbine hub 17.

The stator 5 is arranged between inner peripheral portions of the impeller 3 and the turbine 4 and is a mechanism for redirecting the flow of operating oil returning from the turbine 4 to the impeller 3. The stator 5 includes chiefly a circular disk-shaped stator carrier 20 and a plurality of stator blades 21 provided on an outer peripheral surface of the stator carrier. The stator carrier 20 is supported on a stationary shaft (not shown) through a one-way clutch. A thrust washer 25 is provided axially between the front cover 2 and the turbine hub 16, and thrust bearings 26 and 27 are provided between the turbine hub 17 and the stator carrier 20 and between the stator carrier 20 and the impeller shell 12, respectively.

[Lockup Device]

The lockup device is arranged in an annular space between the front cover 2 and the turbine 4. The lockup device 7 includes chiefly a piston 30, a drive plate 31, a plurality of outer peripheral-side and inner peripheral side torsion springs 32 and 33, an intermediate member 34 that couples the torsion springs 32 on the outer peripheral-side and the torsion springs 33 on the inner peripheral side, and a driven plate 35. The intermediate member 34, the inner peripheral side torsion springs 33, and the driven plate 35 constitute an output portion.

<Piston>

The piston 30 is a circular disk-shaped plate member arranged to divide a space between the front cover 2 and the turbine 4 in two in an axial direction. An outer peripheral portion of the piston 30 forms a flat friction coupling portion 30a, and a friction facing 37 is formed on an axial-direction engine side of the friction coupling portion 30a. A flat friction surface is formed on the front cover 2 facing the friction facing 37. An inner peripheral cylindrical portion 30b extending in an axial direction toward the transmission is provided on an inner peripheral edge of the piston 30. An inner peripheral surface of the inner peripheral cylindrical portion 30b is supported such that it can move in an axial direction and a rotational direction with respect to an outer peripheral surface of the turbine hub 17. When a tip end of the inner cylindrical portion 30b contacts a portion of the turbine hub 17, the piston 30 is restricted from moving further in an axial direction toward the transmission. A seal ring 38 is provided between the inner peripheral cylindrical portion 30b and the outer peripheral surface of the turbine hub 17.

In this way, a space A is formed between the front cover 2 and the piston 30. An outer peripheral portion of the space A is blocked by the friction facing 37 contacting the front cover 2, and an inner peripheral portion of the space A is coupled to an oil passage formed in the input shaft via a groove formed in the thrust washer 25.

<Drive Plate>

The drive plate 31 is an annular member made of sheet metal and arranged on the axial-direction transmission side of the friction coupling portion 30a of the piston 30. An inner peripheral portion of the drive plate 31 is fastened to the piston 30 with a plurality of rivets 40. A plurality of engaging portions 31a that extend toward the transmission in an axial direction are formed on an outer peripheral portion of the drive plate 31. The engaging portions 31a are formed with a prescribed spacing in a circumferential direction and support the end faces of the outer peripheral-side torsion springs 32.

<Outer Peripheral-Side Torsion Springs and Float Member>

Each of the outer peripheral-side torsion springs 32 includes a combination of a large coil spring and a small coil spring that is inserted into an interior of the large coil spring and has a shorter spring length than the large coil spring. In this embodiment, a total of eight outer peripheral-side torsion springs 32 are provided in pairs of two, and the float member 42 is provided such that the two outer peripheral-side torsion springs 32 of each pair operate in series.

The float member 42 has a main body portion 42a that covers the outer peripheral-side torsion springs 32 and an inner peripheral support portion 42b for supporting the main body portion 42a with respect to the intermediate member 34.

The main body portion 42a is configured to have the cross sectional shape of a circular ring with a portion missing. That is, the main body portion 42a covers an outer peripheral portion and a turbine-side side portion of the outer peripheral-side torsion springs 32 and a portion on the engine side is open. The inner peripheral support portion 42b extends farther toward the inner periphery from an inner peripheral end portion of the main body portion 42a. As shown in FIG. 2, a plurality of elongated holes 42c are formed in the inner peripheral support portion 42b with a prescribed spacing in a circumferential direction. The elongated holes 42c have a prescribed length in the circumferential direction, and stop pins 46 provided on the intermediate member 34 are passed through the elongated holes 42c. With such a configuration, the float member 42 can rotate relative to the drive plate 31 and the intermediate member 34 in a prescribed rotational angular range.

On portions of the main body portion 42a of the float member 42 are formed a plurality of folded portions 42d that are folded over such that they extend toward the engine in an axial direction. The bent portions 42d are inserted between one pair of outer peripheral-side torsion springs 32. That is, both circumferential-direction end faces of the bent portions 42d abut against an end face of a corresponding torsion spring 32.

Thus, as explained previously, the outer peripheral-side torsion springs 32 are arranged such that both circumferential-direction ends of each pair of outer peripheral-side torsion springs 32 are supported by the engaging portions 31a of the drive plate 31 and the bent portions 42d of the float member 42 are inserted into an intermediate portion of each pair of outer peripheral-side torsion springs 32. Also, the outer peripheral portions of the outer peripheral-side torsion springs 32 are supported by an outer peripheral portion of the main body portion 42a.

<Intermediate Member>

The intermediate member 34 is an annular or circular disk-shaped plate member arranged between the piston 30 and the turbine shell 15. The intermediate member 34 includes a first plate 44 and a second plate 45. The first plate 44 and the second plate 45 are arranged to be spaced apart along the axial direction. The first plate 44 is arranged on the axial-direction transmission side and the second plate 45 is arranged on the axial-direction engine side. The first plate 44 and the second plate 45 are coupled at their outer peripheral portions with stop pins 46 such that they cannot undergo relative rotation and cannot move in the axial direction with respect to each other. The inner peripheral support portion 42b of the float member 42 is arranged between the first plate 44 and the second plate 45. The first plate 44 and the second plate 45 each have window portions 44a and 45a that pass through in an axial direction. As is clear in FIG. 2, the window portions 44a and 45a extend in the circumferential direction and have cut and lifted portions that are cut and lifted in an axial direction formed on inner peripheral portions and outer peripheral portions.

A plurality of engaging portions 45b that extend to the outer peripheral-side torsion springs 32 are formed on an outer peripheral end of the second plate 45. The engaging portions 45b are formed by bending tip ends of the second plate 45 toward the engine in an axial direction. The engaging portions 45b are arranged with a prescribed spacing in-between in the circumferential direction and a pair of series-operating outer peripheral-side torsion springs 32 is arranged between two engaging portions 45b. Spring support portions 45c that extend toward the engine in an axial direction are formed on the second plate 45 above portions where the first plate 44 is fastened thereto. The spring support portions 45c support an inner peripheral side of the outer peripheral-side torsion springs 32.

<Inner Peripheral-Side Torsion Springs>

Each of the inner peripheral-side torsion springs 33 includes a combination of a large coil spring and a small coil spring that is inserted into an interior of the large coil spring and has the same spring length as the large coil spring. Each of the inner peripheral-side torsion springs 33 is arranged inside window portions 44a and 45a of both plates 44 and 45 of the intermediate member 34. Thus, both circumferential-direction ends and both radial-direction sides of each of the inner peripheral-side torsion springs 33 are supported by the window portions 44a and 45a. Additionally, the inner peripheral-side torsion springs 33 are restricted from dislodging in an axial direction by the cut and lifted portions of the window portions 44 and 45.

<Driven Plate>

The driven plate 35 is an annular or circular disk-shaped member, an inner peripheral portion of which is fastened along with the turbine shell 15 to the flange 17a of the turbine hub 17 with rivets 18. The driven plate 35 is arranged between the first plate 44 and the second plate 45 such that it can rotate relative to both plates 44 and 45 Window holes 35a are formed in an outer peripheral portion of the driven plate 35 so as to correspond to the window portions 44a and 45a of the first and second plates 44 and 45. The window holes 35a are holes passing through in the axial direction and the inner peripheral-side torsion springs 33 are arranged in these window holes 35a.

[Operation]

Next, the operation will be explained. A torque from the crankshaft of the engine is inputted to the front cover 2. As a result, the impeller 3 rotates and the operating oil flows from the impeller 3 to the turbine 4. This flow of operating oil causes the turbine 4 to rotate and the torque of the turbine 4 is outputted to an input shaft (not shown).

A speed ratio of the torque converter 1 increases and when the input shaft reaches a prescribed rotational speed, the operating oil in the space A drains through an oil passage inside the input shaft. As a result, the piston 30 moves toward the front cover 2. As a result, the friction facing 37 of the piston 30 is pressed against the friction surface of the front cover 2 and torque of the front cover 2 is outputted to the lockup device 7.

In the lockup device 7, the torque is transmitted in succession to the piston 30, the drive plate 31, the outer peripheral-side torsion springs 32, the intermediate member 34, the inner peripheral-side torsion springs 33, and the driven plate 35 and outputted to the turbine hub 17.

In addition to transmitting torque, the lockup device 7 absorbs and attenuates torque fluctuations inputted from the front cover 2. More specifically, when torsional vibrations occur in the lockup device 7, the outer peripheral-side torsion springs 32 and the inner peripheral-side torsion springs 33 are compressed in series between the drive plate 31 and the driven plate 35. Additionally, the outer peripheral-side torsion springs 32 operate such that one pair of outer peripheral-side torsion springs 32 are compressed in series through the float member 42. Consequently, the twisting angle can be widened. Moreover, an even wider twisting angle can be secured because series operation is executed at the outer peripheral-side torsion springs 32, where a longer distance can be secured in a circumferential direction. This means that the twisting characteristic can be changed to a lower stiffness and the vibration absorption and attenuation performance can be further improved.

Meanwhile, the outer peripheral-side torsion springs 32 will attempt to move toward the outer periphery due to centrifugal force. Consequently, it is necessary to provide a member to restrict movement of the outer peripheral-side torsion springs 32 toward the outer periphery. In this embodiment, movement of the outer peripheral-side torsion springs 32 toward the outer periphery is restricted by supporting an outer peripheral portion of the outer peripheral-side torsion springs 32 with the float member 42. Thus, since the float member 42 moves together with the outer peripheral-side torsion springs 32, the sliding resistance can be made smaller than a conventional device in which the outer peripheral portions of the outer peripheral-side torsion springs are supported by the drive plate.

Also, the float member 42 covers the outer peripheral portions and transmission-side side portions of the outer peripheral-side torsion springs 32 and an inner peripheral end portion thereof extends between the first plate 44 and the second plate 45 of the intermediate member 34. That is, the float member 42 can secure a comparatively long length in a radial direction. Consequently, the stiffness of the float member 42 can be increased and a rotational strength of the float member 42 with respect to a centrifugal force of itself and a centrifugal force of the outer peripheral-side torsion springs 32.

Additionally, with this embodiment, since the outer peripheral-side torsion springs 32 and the inner peripheral-side torsion springs 33 are coupled by the intermediate member 34, an overall hysteresis torque includes a coupling of the hysteresis torques of the inner peripheral side and the outer peripheral side. That is, with this embodiment, the hysteresis torques of the outer peripheral-side torsion springs is smaller than in the conventional device presented in Patent Document 1 and the hysteresis torque of the inner peripheral-side torsion springs is not different. Consequently, the overall hysteresis torque is even smaller. As a result, the vibration absorption and attenuation performance can be improved and a lower fuel consumption can be achieved due to an expansion of a lockup region.

<Other Embodiments>

The present invention is not limited to the embodiment explained heretofore and various modifications and revisions can be made without departing from the scope of the present invention.

For example, although coil springs are used as the elastic members in the previously explained embodiment, it is acceptable to use elastic members made of resin or the like.

Also, the numbers and lengths of the coil springs including the outer peripheral-side and inner peripheral-side torsion springs are not limited to the previously explained embodiment.

INDUSTRIAL APPLICABILITY

With a simple structure, the lockup device can increase the stiffness of a float member serving to make a plurality of elastic members operate in series.

With the present invention as explained heretofore, the rigidity of a float member in a lockup device can be increased with a simple structure.

The invention claimed is:

1. A lockup apparatus for a torque converter that is arranged between a front cover and a turbine of a torque converter and configured to couple mechanically the front cover and the turbine, the lockup apparatus comprising:
   a piston being coupled to the front cover;
   a drive plate being directly coupled to the piston;
   first and second elastic members to which a torque is inputted from the drive plate;
   a float member being arranged on a turbine side of the first elastic member, and being configured to make the first and second elastic members operate in series; and
   an output portion being configured to couple the first and second elastic members and the turbine,
   the float member including
      a main body portion that covers an outer peripheral portion and a turbine-side side portion of the first elastic member, and
      an inner peripheral support portion extending from the main body portion toward an inner periphery and being supported such that the inner peripheral support portion is rotatable relative to the output portion
   the output portion including
      an intermediate member having first and second plates, the inner peripheral support portion of the float member being disposed between the first and second plates, and
      a pin fastening the first plate to the second plate and passing through the inner peripheral support portion of the float member.

2. The lockup device for the torque converter according to claim 1, wherein
   the output portion includes
      a driven plate being coupled to the turbine,
      first and second inner peripheral-side elastic members being arranged on the inner peripheral side of the first and second elastic members and are configured to transmit torque to the driven plate, and
      the intermediate member being rotatable relative to the drive plate and the driven plate and being configured to transmit torque from the first and second elastic members to the first and second inner peripheral-side elastic members.

3. The lockup device for the torque converter according to claim 2, wherein
   the first plate and the second plate are arranged on both axial-direction sides of the driven plate,
   the intermediate member is configured to support the first and second inner peripheral-side elastic members, and
   the inner peripheral support portion of the float member is supported such that the inner peripheral support portion is rotatable-in a prescribed angular range with respect to the pin.

* * * * *